United States Patent
Yun et al.

(10) Patent No.: US 12,296,426 B2
(45) Date of Patent: May 13, 2025

(54) ELECTRICAL DRIVING SYSTEM FOR MACHINE TOOL

(71) Applicant: KHANSTN CO., LTD., Changwon-si (KR)

(72) Inventors: Yongseon Yun, Changwon-si (KR); Bonsaeng Ku, Changwon-si (KR)

(73) Assignee: KHANSTN CO., LTD., Changwon-si (KR)

( * ) Notice: Subject to any disclaimer, the term of this patent is extended or adjusted under 35 U.S.C. 154(b) by 994 days.

(21) Appl. No.: 17/274,662

(22) PCT Filed: Sep. 18, 2019

(86) PCT No.: PCT/KR2019/012091
§ 371 (c)(1),
(2) Date: Mar. 9, 2021

(87) PCT Pub. No.: WO2020/060201
PCT Pub. Date: Mar. 26, 2020

(65) Prior Publication Data
US 2021/0323107 A1    Oct. 21, 2021

(30) Foreign Application Priority Data

Sep. 18, 2018   (KR) ........................ 10-2018-0111449

(51) Int. Cl.
*B23Q 5/10*    (2006.01)
(52) U.S. Cl.
CPC .......... *B23Q 5/10* (2013.01); *B23B 2260/034* (2013.01); *B23B 2260/044* (2013.01); *B23B 2270/48* (2013.01); *B23Q 2705/005* (2013.01)
(58) Field of Classification Search
CPC .... B23Q 5/10; B23Q 2705/005; B23Q 5/043; B23B 2260/034; B23B 2260/044; B23B 2270/48; B23B 31/16266; B23B 31/26
See application file for complete search history.

(56) References Cited

U.S. PATENT DOCUMENTS

| | | | | | |
|---|---|---|---|---|---|
| 5,072,636 | A | * | 12/1991 | Gueli | B23Q 39/02 82/132 |
| 2004/0051256 | A1 | * | 3/2004 | Ayrton | B23B 31/16037 279/4.01 |

(Continued)

FOREIGN PATENT DOCUMENTS

| | | | | |
|---|---|---|---|---|
| JP | 2001-009607 A | | 1/2001 | |
| KR | 2012071434 A | * | 7/2012 | ............... B23Q 1/70 |

(Continued)

OTHER PUBLICATIONS

International Search Report for PCT/KR2019/012091 mailed Jan. 13, 2020 from Korean Intellectual Property Office.

*Primary Examiner* — Sara Addisu
(74) *Attorney, Agent, or Firm* — Paratus Law Group, PLLC

(57) ABSTRACT

Disclosed is a machine tool ELECTRICAL DRIVING SYSTEM capable of selectively transmitting power of a motor for driving a spindle in a lathe which machines a workpiece to a rotation system including a drawbar and a spindle for driving a chuck, using a clutch mechanism. The machine tool ELECTRICAL DRIVING SYSTEM includes a housing, a hollow tubular spindle rotatably installed inside the housing, a drive pulley rotatably installed with respect to the spindle outside the spindle, a spindle motor, a drawbar installed to be linearly movable with respect to the spindle but non-rotatable relative to the spindle, a motion conversion unit configured to convert a rotary motion of the drive pulley into a forward-rearward linear motion of the drawbar, a clutch unit, a position detection unit configured to the drive pulley to detect an amount of rotation and a rotation position of the drive pulley, and a controller.

5 Claims, 11 Drawing Sheets

(56) References Cited

U.S. PATENT DOCUMENTS

| | | | |
|---|---|---|---|
| 2007/0224007 A1* | 9/2007 | Shinohara | B23B 25/00 29/27 R |
| 2007/0227317 A1* | 10/2007 | Asahara | B23B 3/161 82/119 |
| 2017/0080539 A1 | 3/2017 | Hirayama et al. | |
| 2021/0053168 A1* | 2/2021 | Chang | B23B 31/26 |

FOREIGN PATENT DOCUMENTS

| | | | | |
|---|---|---|---|---|
| KR | 10-2016-0072569 A | | 6/2016 | |
| KR | 10-2017-0121605 A | | 11/2017 | |
| KR | 20170121605 A | * | 11/2017 | B23B 31/0261 |
| KR | 10-1825184 B1 | | 2/2018 | |
| WO | WO-2008086071 A2 | * | 7/2008 | B23Q 5/043 |

* cited by examiner

[FIG 1]
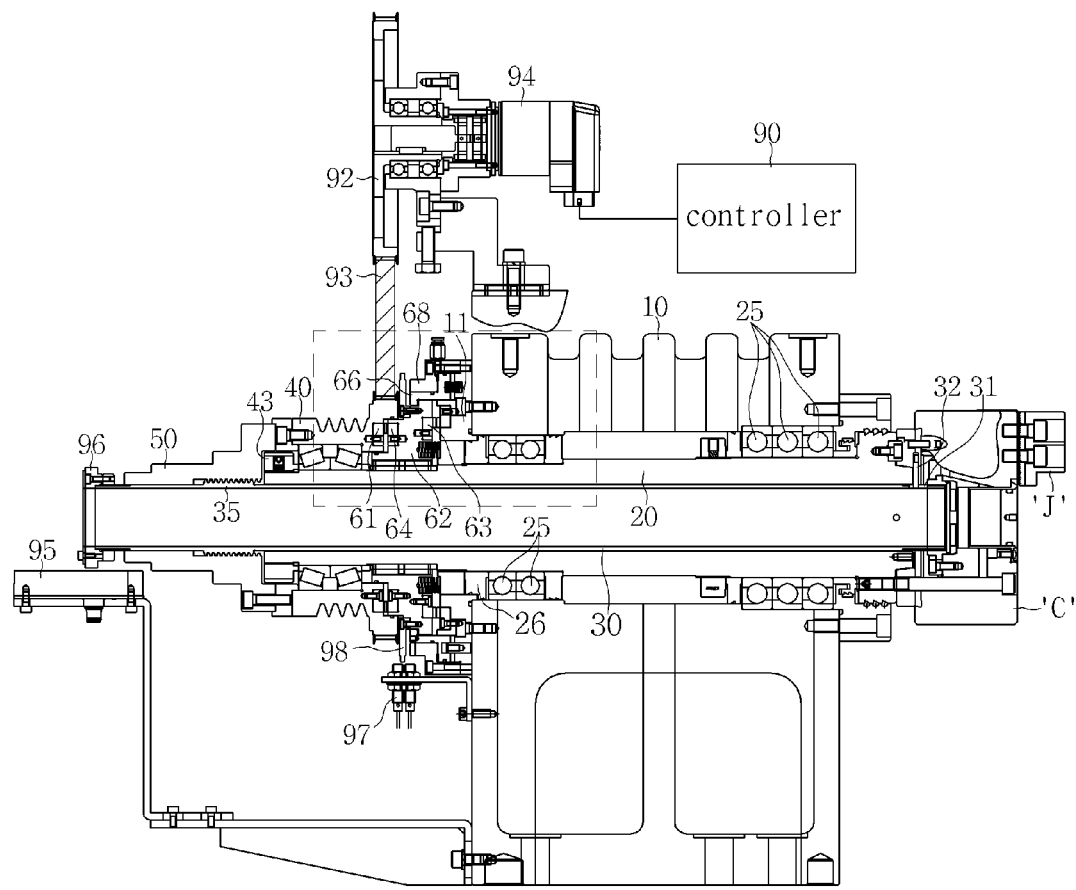

[FIG 2]
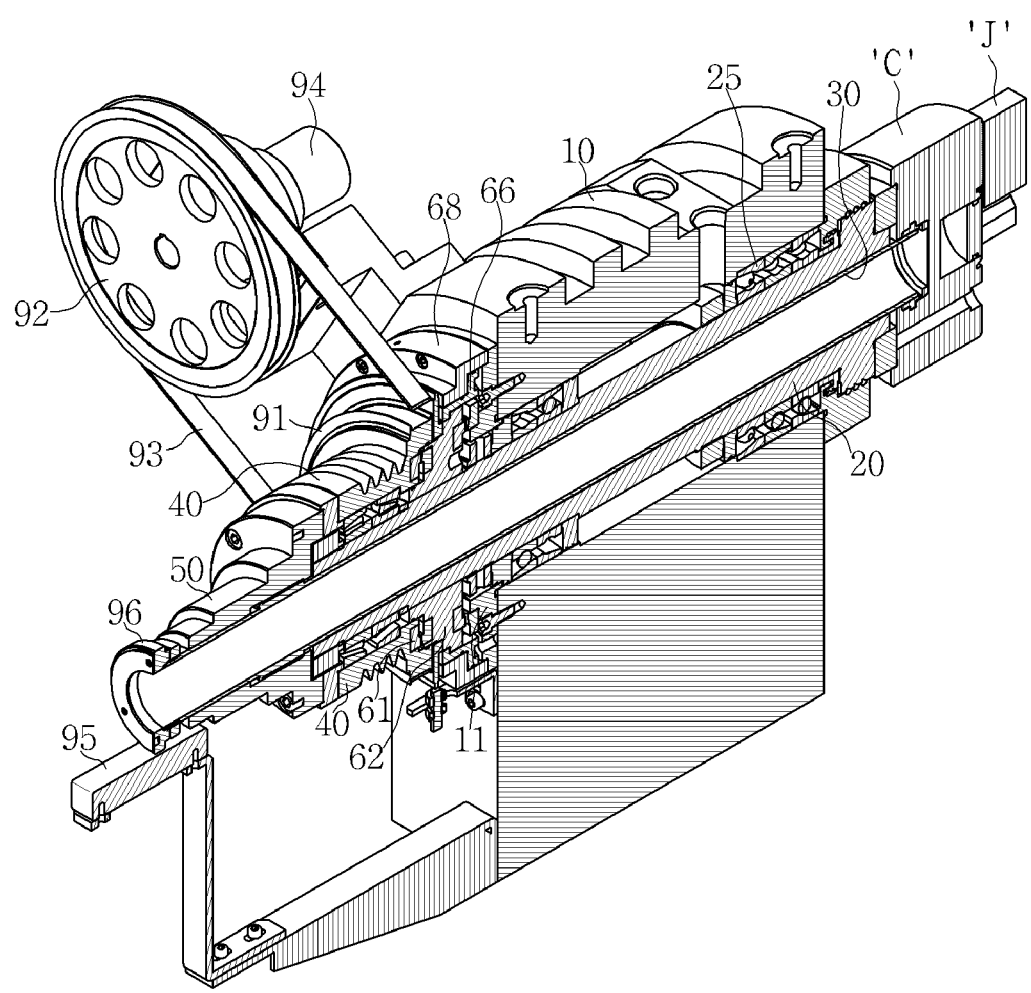

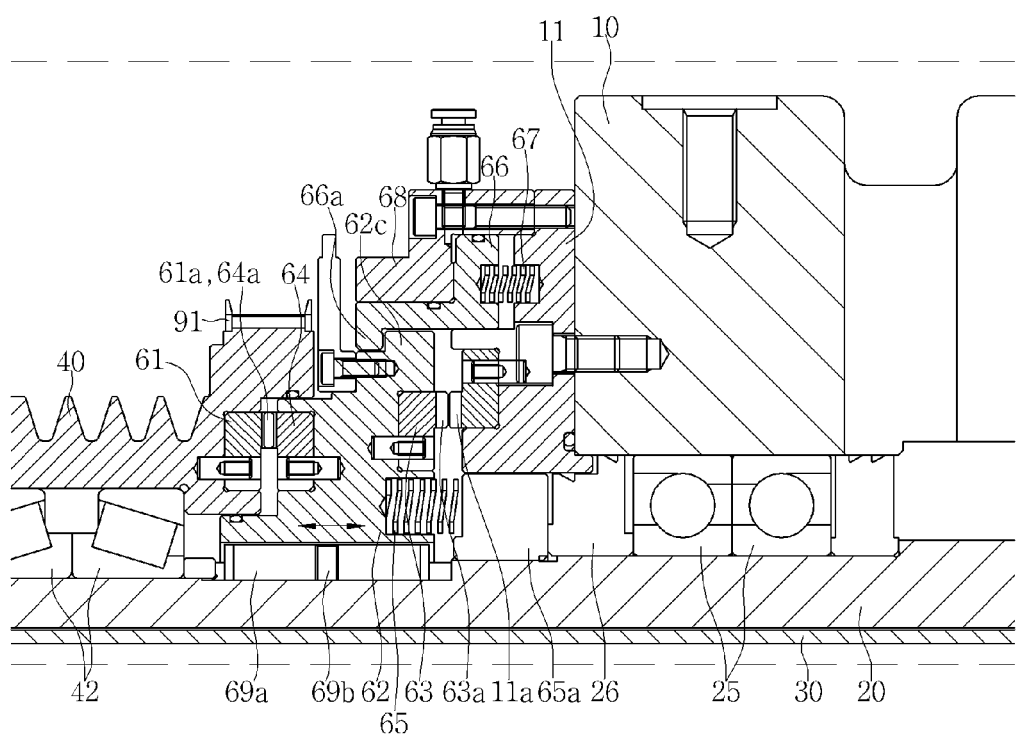
[FIG 3]

【FIG 4】
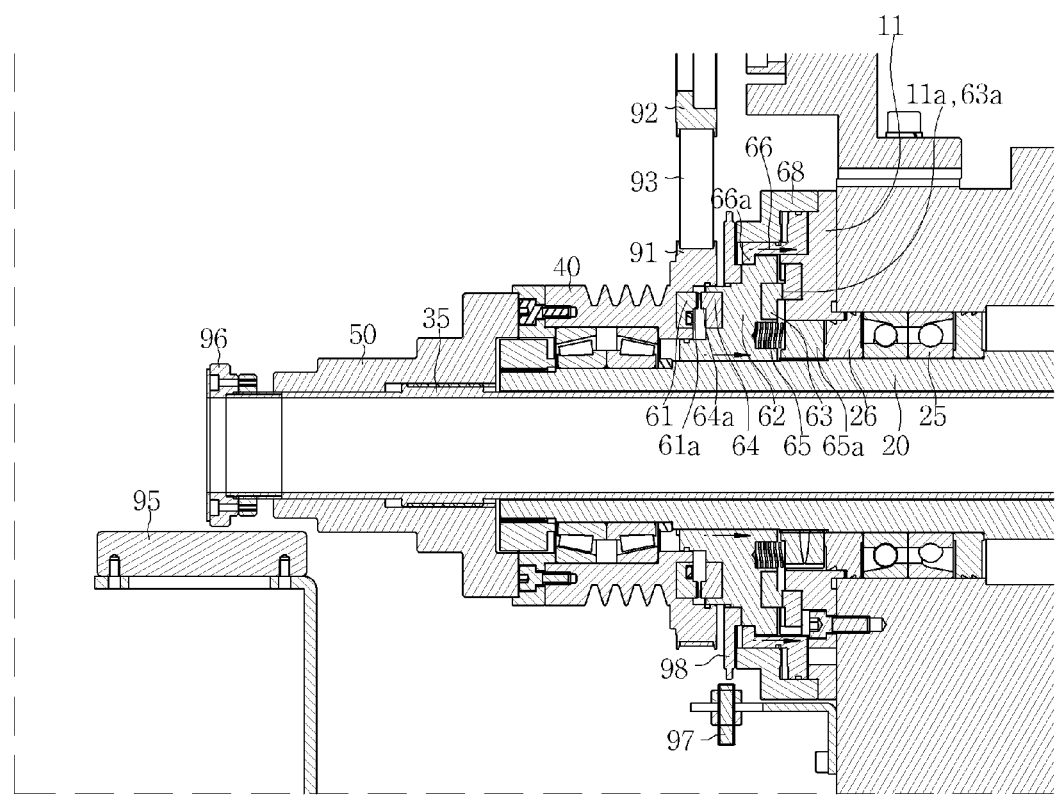

[FIG 5]
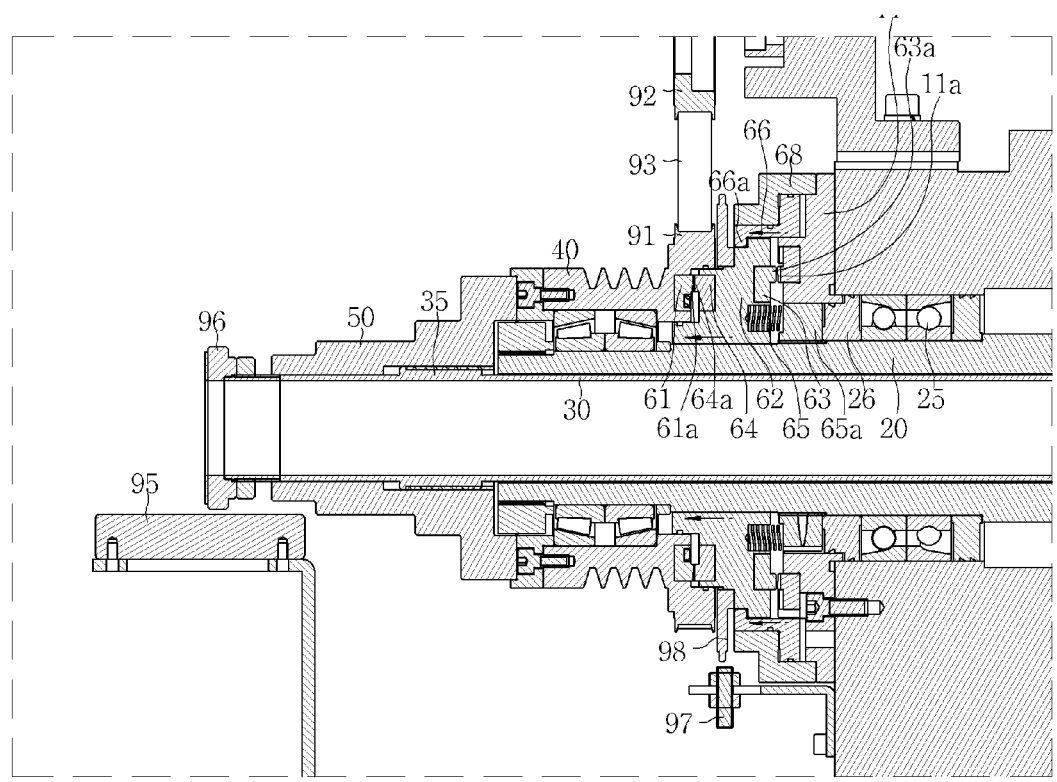

[FIG 6]
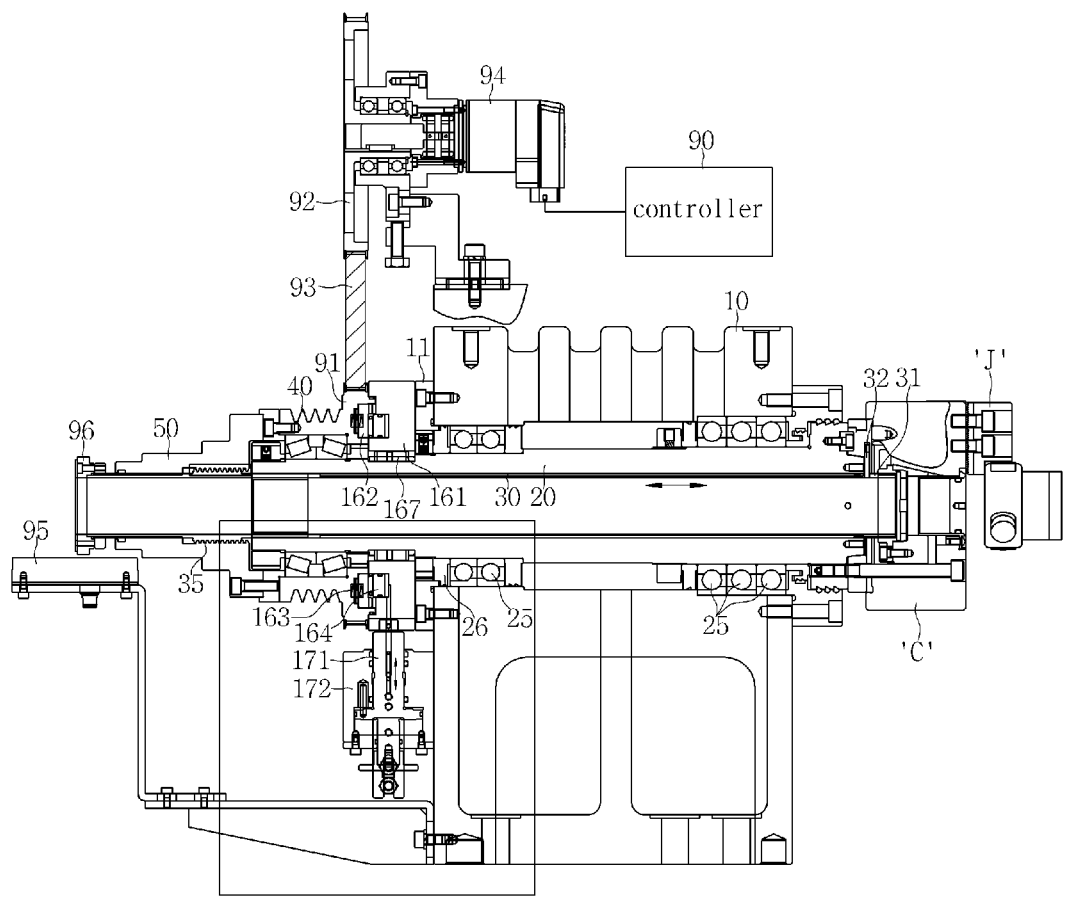

[FIG 7]
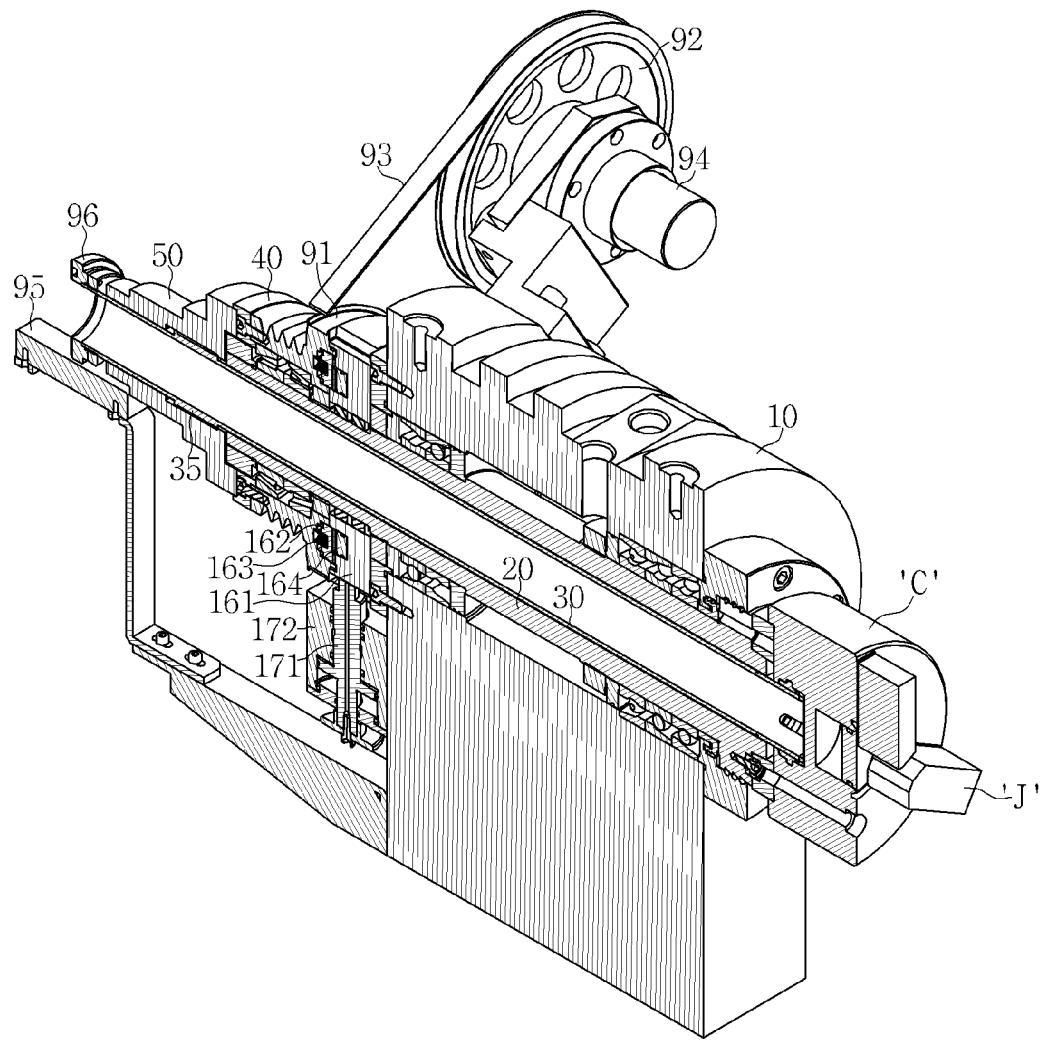

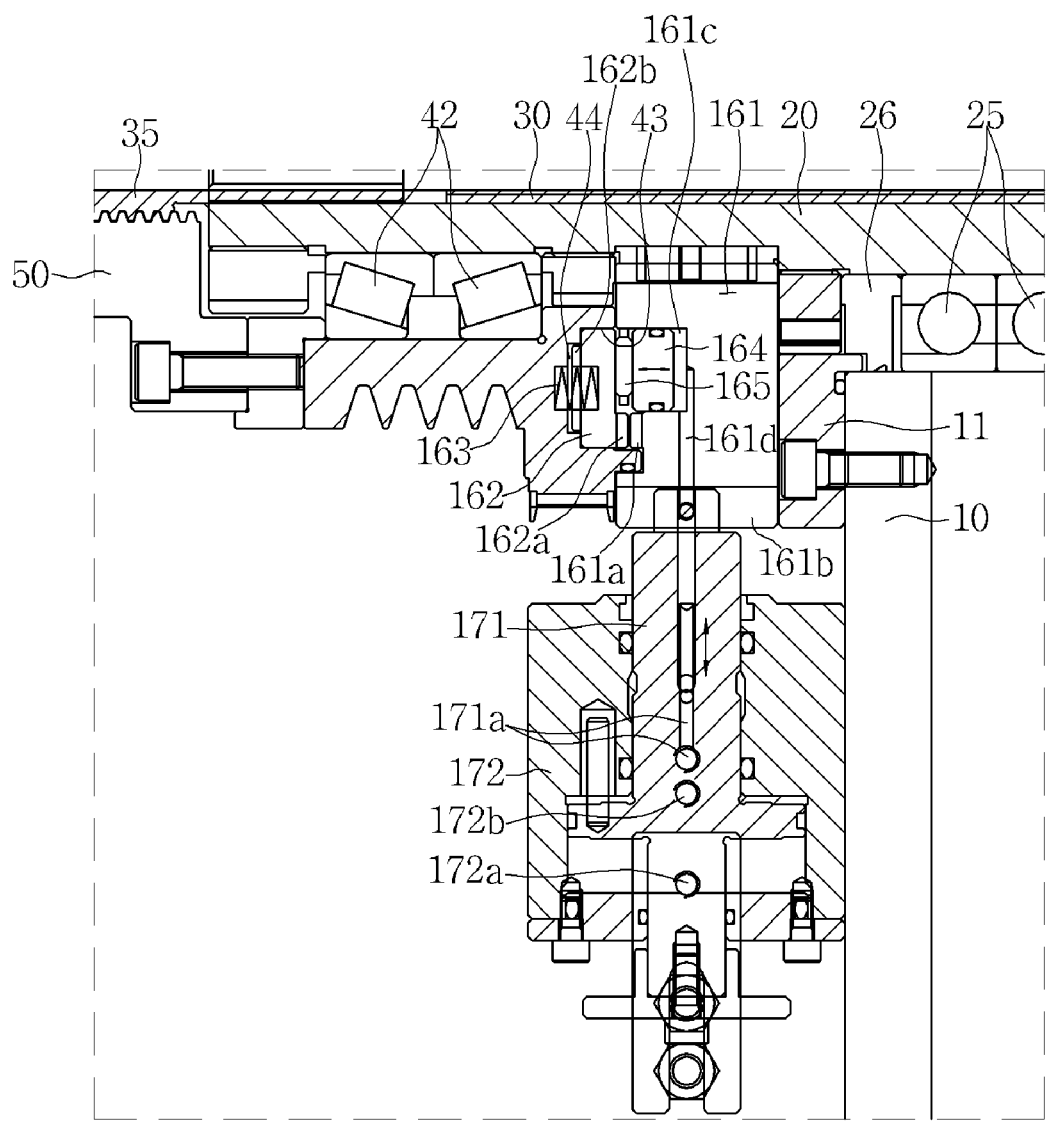
[FIG 8]

[FIG 9]
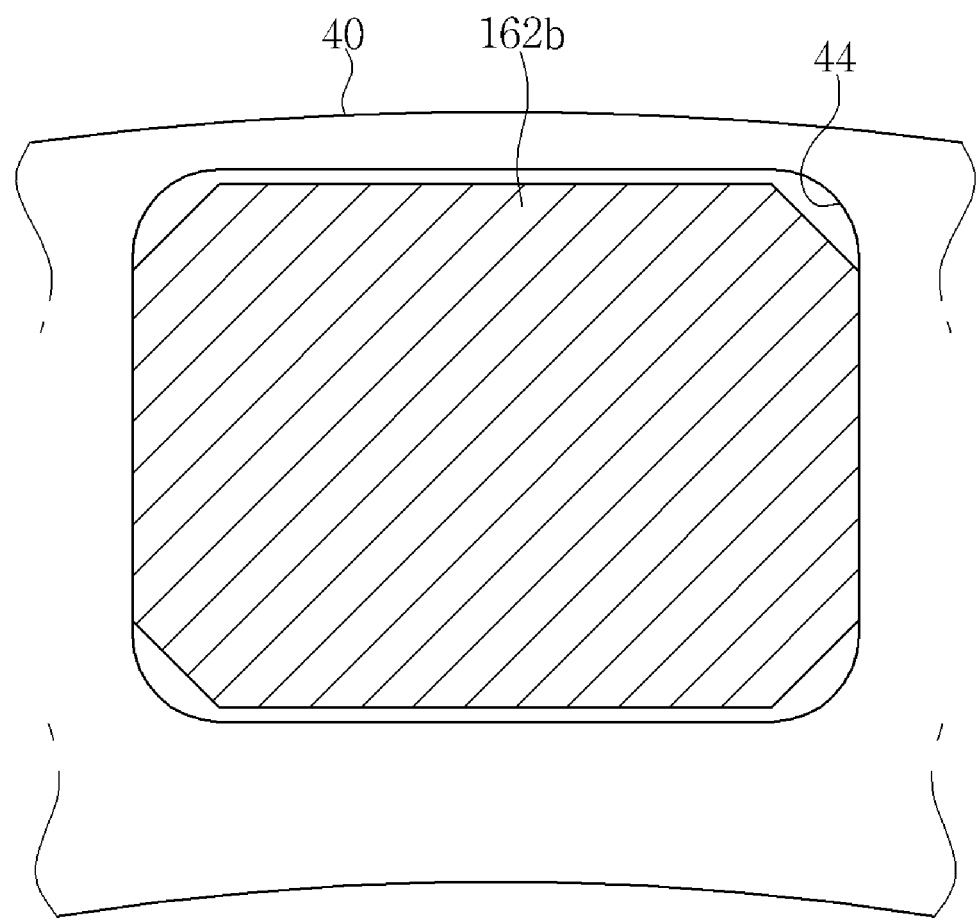

[FIG 10]
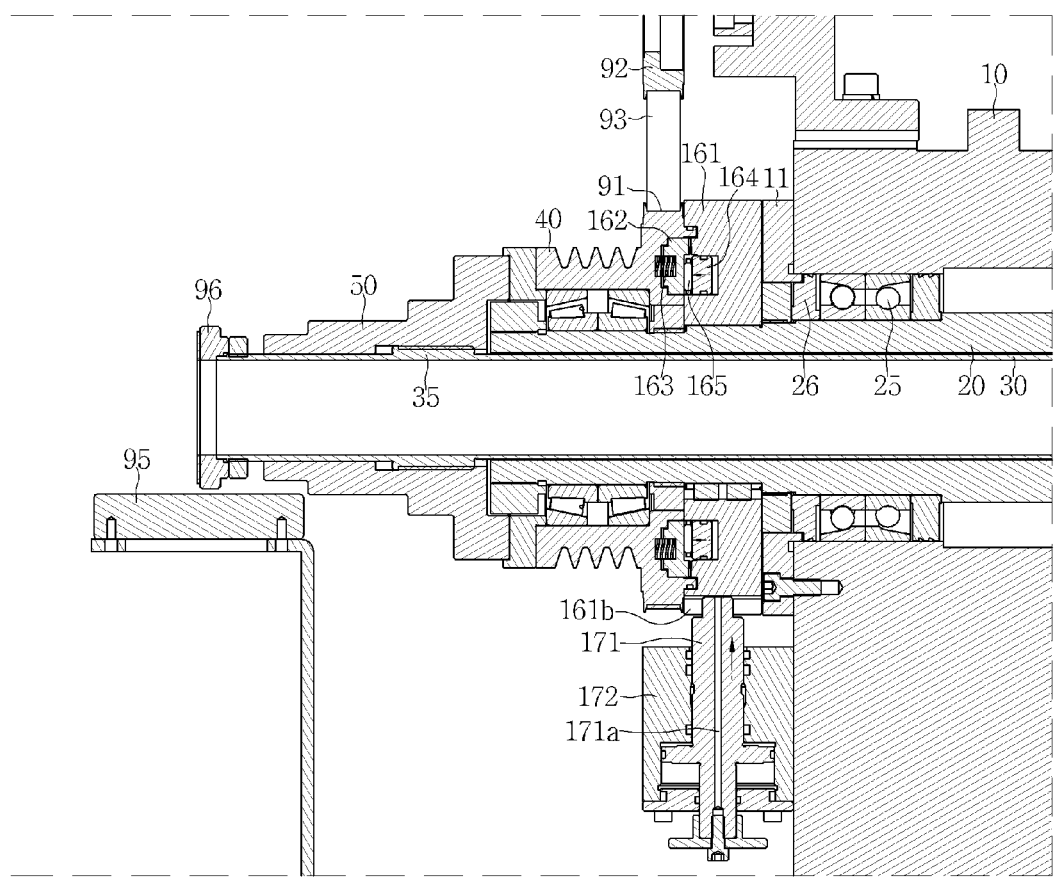

[FIG 11]
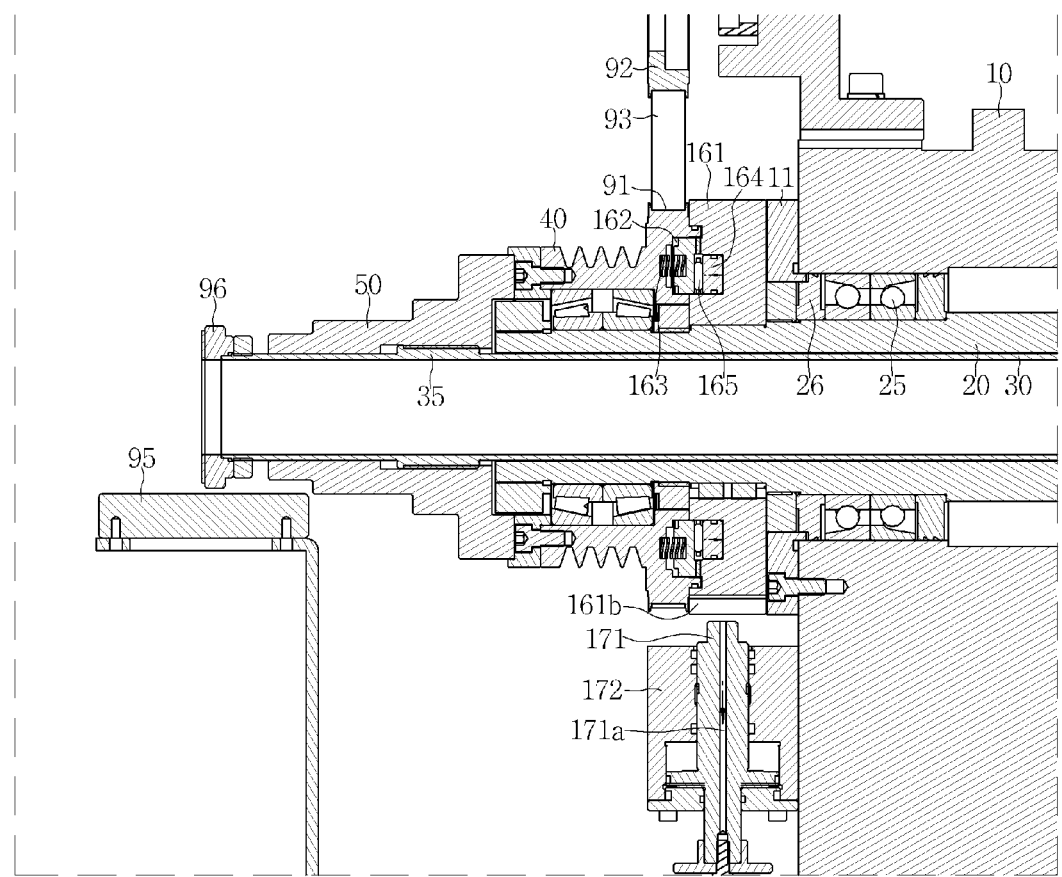

ELECTRICAL DRIVING SYSTEM FOR MACHINE TOOL

CROSS-REFERENCE TO PRIOR APPLICATIONS

This application is a National Stage Patent Application of PCT International Patent Application No. PCT/KR2019/012091 (filed on Sep. 18, 2019) under 35 U.S.C. § 371, which claims priority to Korean Patent Application No. 10-2018-0111449 (filed on Sep. 18, 2018), which are all hereby incorporated by reference in their entirety.

BACKGROUND

The present disclosure relates to a machine tool, and more particularly, a machine tool ELECTRICAL DRIVING SYSTEM capable of selectively transmitting power of a motor for driving a spindle in a lathe which machines a workpiece to a rotation system including a drawbar and a spindle for driving a chuck, using a clutch mechanism.

In general, a machine tool includes a workpiece and a machining tool, and when one of the two is fixed, the other rotates to machine a shape of the workpiece, and the machine tool can be divided into a lathe and a milling machine according to a rotating unit.

The lathe is configured in such a way that the workpiece rotates in a state where the machining tool is stationary, and typically, includes a chuck for fixing the workpiece, a drawbar for driving the chuck, and a spindle for rotating the drawbar, the chuck, and the workpiece.

A hydraulic system is mainly applied to the drawbar, and an electric system is mainly applied to the spindle. In a lathe of the related art, separate drive systems are required to drive a drawbar and a spindle respectively. In a drawbar of the related art that is operated hydraulically, there are problems in that a driving unit is complicated, a chuck cannot control a force to hold a workpiece, and the efficiency is low. Accordingly, efforts have been made to develop an ELECTRICAL DRIVING SYSTEM that converts a rotational force of an electric motor into thrust of the drawbar by applying a lead screw to replace the existing hydraulic system with an electric system.

In an ELECTRICAL DRIVING SYSTEM of the machine tool, a spindle is selectively connected to a housing and a drive element (for example, a drive pulley) through an operation of a clutch device, and a clamping operation (clamping operation mode) of the workpiece and a machining operation (spindle operation mode) of the workpiece are generally performed.

However, in the related art, when the spindle operation mode is performed on a workpiece to machine the workpiece, and then the spindle stops, a position of the spindle is not accurately known. Therefore, when components of the clutch device that engages with the spindle are linearly moved and the mode is switched to the clamping operation mode, a serration formed in the clutch device may not be correctly engaged. Conversely, when the workpiece is clamped in the clamping operation mode and then the mode is switched to the spindle operation mode, the serration is not correctly engaged. In this state, when the spindle rotates at a high speed, the rotational force of the drive element may not be accurately transmitted to the spindle through the clutch device, causing vibrations, noises, and processing defects.

SUMMARY

The present disclosure is to solve the above problems, and an object of the present disclosure is to provide a machine tool ELECTRICAL DRIVING SYSTEM capable of correctly engaging a serration of a clutch device when positions of the serration of a clutch unit are detected in real time and an operation mode is switched.

Technical objects to be achieved by the present disclosure are not limited to the aforementioned technical objects, and other technical objects not described above may be evidently understood by a person having ordinary skill in the art to which the present disclosure pertains from the following description.

According to an aspect of the present disclosure, there is provided a machine tool ELECTRICAL DRIVING SYSTEM including: a housing installed to be fixed to a main body of a machine tool; a hollow tubular spindle rotatably installed with respect to the housing inside the housing; a drive pulley rotatably installed with respect to the spindle outside the spindle; a spindle motor configured to rotate the drive pulley; a drawbar installed to be linearly movable with respect to the spindle but non-rotatable relative to the spindle in an axial direction inside the spindle to linearly move with respect to the spindle in the axial direction or to rotate together with the spindle; a motion conversion unit configured to convert a rotary motion of the drive pulley into a forward-rearward linear motion of the drawbar; a clutch unit installed outside the spindle to selectively connect the spindle to the drive pulley and the housing; a position detection unit including a first encoder pulley fixed to the drive pulley, a second encoder pulley installed in the housing, a timing belt wound around the first encoder pulley and the second encoder pulley to transmit a rotational force of the first encoder pulley to the second encoder pulley, and an encoder axially coupled with the second encoder pulley to detect an amount of rotation and a rotation position; and a controller configured to perform a position adjustment process of rotating the drive pulley based on position information of the clutch unit detected by the position detection unit immediately before a spindle operation mode state in which the spindle is connected to the drive pulley by the clutch unit is switched to a clamping operation mode in which the spindle is connected to the housing and immediately before the clamping operation mode is switched to the spindle operation mode, and aligning the drive pulley to the position of the clutch unit.

Immediately before switching from the spindle operation mode to the clamping operation mode, the controller rotates the drive pulley based on the position information of the clutch unit detected by the position detection unit to align the clutch unit to the initial origin position, and the clamping operation immediately before switching from the mode to the spindle operation mode, the drive pulley is finely rotated in the clamping direction so that the serrations of the clutch unit engage with each other based on the position information of the clutch unit detected by the position detection unit.

In one embodiment of the present disclosure, the clutch unit may include a fixed clutch fixed to a front surface of the drive pulley and having a fixed serration formed along a circumferential direction, a movable clutch formed in a ring shape and slidable on an outer surface of the spindle in the axial direction but non-rotatable relative to the outer surface, a front coupler installed on a front surface of the movable clutch and having a front serration formed to engage with a housing serration formed behind the housing, a rear coupler installed on a rear surface of the movable clutch and having a rear serration formed to engage the fixed serration of the fixed clutch, and a clutch driving unit configured to linearly move the movable clutch in the axial direction of the spindle.

The controller rotates the drive pulley based on the position information detected by the position detection unit immediately before the spindle operation mode is switched to the clamping operation mode to align a position of the movable clutch to an initial original position, and the controller rotates the drive pulley in a clamping direction to finely adjust the position of the fixed clutch and align the fixed serration of the fixed clutch with the rear serration of the movable clutch based on the position information detected by the position detection unit immediately before the clamping operation mode is switched to the spindle operation mode.

The clutch driving unit may include a spring mount member installed to be fixed to an outer surface of the spindle between a front portion of the movable clutch and a rear end portion of the housing, a first elastic member installed in the spring mount member to apply an elastic force to a rear portion of the movable clutch, a ring-shaped clutch piston installed to be axially movable in the housing and including a traction protrusion connected to an outer peripheral surface of the movable clutch and formed to protrude radially inward in a rear end portion, a second elastic member configured to apply an elastic force to the rear end portion of the housing rearward of the clutch piston, and a piston actuator configured to apply an external force forward to the clutch piston to move forward the clutch piston.

A clutch key and a clutch key groove that allows the movable clutch to axially move with respect to the spindle but restricts the movable clutch from rotating in a circumferential direction may be provided between an inner peripheral surface of the movable clutch and the outer surface of the spindle.

The motion conversion unit may include a leadscrew portion fixed to a rear portion of the drawbar and having a screw thread spirally formed on an outer surface, and a cylindrical carrier member coupled to the drive pulley to rotate together with the drive pulley and having a screw thread formed to be spirally coupled to the screw thread of the leadscrew portion on an inner peripheral surface.

According to another aspect of the present disclosure, the clutch unit includes a fixing member installed to be non-rotatable relative to an outer surface of the spindle between a front portion of the drive pulley and a rear portion of the housing and having a first serration formed on a rear surface along a circumferential direction, a pulley clutch installed in the front portion of the drive pulley to be movable in a front-rear direction and having the second serration that engages with the first serration when moving forward and is formed along the circumferential direction, a pulley clutch spring configured to apply an elastic force to the drive pulley forward of the pulley clutch, a locking member configured to fix the fixing member to the housing or release the fixing member from the housing, and a clutch operation member configured to move the pulley clutch rearward, in which the controller rotates the drive pulley based on the position information detected by the position detection unit immediately before the spindle operation mode is switched to the clamping operation mode to align a position of the fixing member to an initial original position, and the controller finely rotates the drive pulley in the clamping direction and align the second serration of the pulley clutch with the position of the first serration of the fixing member based on the position information detected by the position detection unit immediately before the clamping operation mode is switched to the spindle operation mode.

The clutch operation member may include a piston ring installed inside a piston accommodation groove formed in the fixing member and configured to push the pulley clutch rearward while moving rearward by a pneumatic pressure applied to an inside of the piston accommodation groove, and a piston bearing disposed between the pulley clutch and the piston ring to rotatably support the pulley clutch with respect to the piston ring.

The locking member includes a fixing pin installed to linearly reciprocate toward the fixing member side behind the housing and having a distal end inserted into a locking groove formed on an outer peripheral surface of the fixing member, and a pin actuator configured to linearly reciprocate the fixing pin.

A pneumatic channel extending from the piston accommodation groove to the locking groove may be formed in the fixing member, an air supply channel communicating with the pneumatic channel when the fixing pin is inserted into the locking groove may be formed in the fixing pin, and the air supply channel may be connected to an external air supply unit to supply air to the piston accommodation groove through the pneumatic channel.

According to the present disclosure, the position of the spindle and the position of the serration of the clutch unit are accurately detected by the position detection unit, and when the spindle operation mode is switched to the clamping operation mode and the clamping operation mode is switched to the spindle operation mode, based on the detected position information, the position of the serration of the clutch unit are accurately arranged so that the serration configured in the clutch unit is accurately engaged always, and thus, a correct driving control is possible in each operation mode.

In addition, due to a self-locking function of the leadscrew portion that is spirally coupled with the screw thread of the carrier member, an initial clamping force can be mainlined when the clamping operation of the workpiece by a rearward movement of the drawbar is switched to the spindle operation mode in which the workpiece is machined by the rotation of the spindle.

BRIEF DESCRIPTION OF THE DRAWINGS

FIG. 1 is a cross-sectional view illustrating the overall configuration of an ELECTRICAL DRIVING SYSTEM according to one embodiment of the present disclosure.

FIG. 2 is a cut-away perspective view illustrating a state where a central portion of the ELECTRICAL DRIVING SYSTEM illustrated in FIG. 1 is cut in an axial direction.

FIG. 3 is an enlarged cross-sectional view illustrating a clutch unit configured in the ELECTRICAL DRIVING SYSTEM illustrated in FIG. 1 in an enlarged manner.

FIGS. 4 and 5 are enlarged cross-sectional views illustrating a main portion of the ELECTRICAL DRIVING SYSTEM illustrated in FIG. 1 in an enlarged manner, FIG. 4 illustrates a clamping operation mode, and FIG. 5 illustrates a spindle operation mode.

FIG. 6 is a cross-sectional view illustrating the overall configuration of an ELECTRICAL DRIVING SYSTEM according to another embodiment of the present disclosure.

FIG. 7 is a cut-away perspective view illustrating a state where a central portion of the ELECTRICAL DRIVING SYSTEM illustrated in FIG. 6 is cut in an axial direction.

FIG. 8 is an enlarged cross-sectional view illustrating a clutch unit configured in the ELECTRICAL DRIVING SYSTEM illustrated in FIG. 6 in an enlarged manner.

FIG. 9 is a front cross-sectional view illustrating a portion of the clutch unit illustrated in FIG. 8 in an enlarged manner.

FIGS. 10 and 11 are enlarged cross-sectional views illustrating a main portion of the ELECTRICAL DRIVING SYSTEM illustrated in FIG. 6 in an enlarged manner, FIG. 10 illustrates a clamping operation mode, and FIG. 11 illustrates a spindle operation mode.

DETAILED DESCRIPTION

Hereinafter, Embodiments described in the present specification and configurations illustrated in the drawings are only preferred examples of the disclosed invention, and there may be various modifications that may replace the embodiments and drawings of the present specification at the time of filing of the present application.

Hereinafter, with reference to the accompanying drawings, a machine tool ELECTRICAL DRIVING SYSTEM and an operation method thereof will be described in detail according to the following embodiments. In the drawings, the same reference numerals denote the same components.

First Embodiment

Referring FIGS. 1 to 5, an ELECTRICAL DRIVING SYSTEM according to a first embodiment of the present disclosure includes a housing 10 that is installed to be fixed to a main body of a machine tool, a hollow tubular spindle 20 that is rotatably installed with respect to the housing inside the housing 10, a drive pulley 40 that is rotatably installed with respect to the spindle 20 outside the spindle 20, a spindle motor (not illustrated) that rotates the drive pulley 40, a drawbar 30 that linearly moves with respect to the spindle 20 inside the spindle 20 to linearly move with respect to the spindle 20 in the axial direction or rotates together with the spindle 20, a leadscrew portion 35 and a carrier member 50 which are a motion conversion unit that converts a rotary motion of the drive pulley 40 into a forward-rearward linear motion of the drawbar 30, a clutch unit that selectively couples the spindle 20 linearly movable in the axial direction with respect to an outer surface of a rear portion of the spindle 20 but non-rotatable relative to the outer surface of the spindle 20 with the drive pulley 40 and the housing 10, a position detection unit that is connected to the drive pulley 40 to detect an amount of rotation and a rotation position, and a controller 90 that receives the position information from the position detection unit to control an operation of the spindle motor (not illustrated).

The housing 10 is formed in an empty tubular shape and is fixedly installed on the main body of the machine tool. A ring-shaped housing rear cover 11 having an opening portion through which the rear portion of the spindle 20 passes is fixedly coupled to a rear end portion of the housing 10. A housing serration 11a for coupling with a front coupler 63 constituting the clutch unit is formed on a rear surface of the housing rear cover 11.

A chuck C for machining a workpiece is provided outside a front portion of the housing 10, and a jaw J for clamping the workpiece is installed in the chuck C so as to be movable in the radial direction. The jaw J is connected to a front end portion of the drawbar 30 through a link member (not illustrated) and clamps or unclamps the workpiece while moving in a radial direction by a forward-rearward linear motion of the drawbar 30.

The spindle 20 is in the form of an elongated cylindrical hollow tube, and is rotatably installed about an axis along an axial direction (front-rear direction) in an inner space of the housing 10. A plurality of spindle bearings 25 rotatably supporting the spindle 20 with respect to the housing 10 are installed between an outer surface of the spindle 20 and an inner surface of the housing 10. The spindle bearings 25 are supported by a spring mount member 65a fixed to the spindle 20 and a bearing support ring 26 (see FIG. 3).

The drawbar 30 is installed to be movable in forward or rearward directions inside the hollow portion of the spindle 20 in a front-rear direction, that is, in the axial direction of the spindle 20 but non-rotatable with respect to the spindle 20. A drawbar keyway 31 is formed to extend in the front-rear direction on an outer peripheral surface of a front portion of the drawbar 30, and a drawbar key 32 inserted into the drawbar keyway 31 is fixed to the front portion of the spindle 20, and thus, the drawbar 30 can move in the axial direction with respect to the spindle 20, but cannot rotate with respect to the spindle 20.

The leadscrew portion 35 having a spirally formed screw thread is formed on an outer surface of the rear portion of the drawbar 30. The leadscrew portion 35 may be formed integrally with the drawbar 30, but differently, the leadscrew portion 35 may be formed as a separate body with the drawbar 30 and then fixed to each other by a separate fastening unit. In this embodiment, the drawbar 30 and the leadscrew portion 35 are illustrated as being formed of a hollow cylindrical body so as to constitute a device for blowing chips and a device for pushing a workpiece. However, differently, each of the drawbar 30 and the leadscrew 35 may be formed of a cylindrical body having a solid structure filled with the inside.

The leadscrew portion 35 functions as a motion conversion unit that receives a rotational force from the carrier member 50 coupled to the drive pulley 40 to move the drawbar 30 forward or rearward.

The spindle motor (not illustrated) is installed outside the housing 10 and is connected to the drive pulley 40 through a power transmission member such as a drive belt (not illustrated) to transmit a rotational force to the drive pulley 40. The spindle motor (not illustrated) may include a spindle encoder (not illustrated) for detecting an amount of rotation and position of the spindle 20. The spindle motor is electrically connected to the controller 90 and is operated by receiving a control signal from the controller 90.

The drive pulley 40 is installed to be rotatable relative to the spindle 20 outside the rear end portion of the spindle 20 and is rotated by receiving power from the spindle motor (not illustrated). A bearing 42 is installed to rotatably support the drive pulley 40 with respect to the spindle 20 between an inner circumferential surface of the drive pulley 40 and the spindle 20. The bearing 42 is fixed to the spindle 20 immediately in front of a lock nut 43 by the lock nut 43 coupled to a rear end of the spindle 20. The front portion of the drive pulley 40 is coupled to the spindle 20 or separated from the spindle 20 by the clutch unit.

The carrier member 50 is fixedly coupled to the rear portion of the drive pulley 40 and rotates together with the drive pulley 40. The carrier member 50 is formed in a cylindrical shape in which a screw thread spirally coupled to the screw thread of the leadscrew portion 35 is formed on an inner peripheral surface. Therefore, when the carrier member 50 rotates, the leadscrew portion 35 and the drawbar 30 move forward or rearward along the axial direction by an action between the screw thread of the carrier member 50 and the screw thread of the leadscrew portion 35. Since the carrier member 50 and the leadscrew portion 35 are coupled to each other through a screw thread, they are self-locked. Accordingly, thrust is not released when the clutch unit is operated, and thus, a separate device for fixing the spindle 20, for example an air piston or the like can be removed.

In order to measure an amount of a forward-rearward transfer of the drawbar 30 to accurately detect position and displacement of the jaw J connected to the drawbar 30, and through this, to accurately ascertain workpiece clamping and unclamping states of the jaw J, one sensor dog 96 is mounted on a rear end portion of the drawbar 30, and a position sensor 95 for detecting the sensor dog 96 is installed to be fixed to the rear end portion of the housing 10.

The clutch unit is installed to be linearly movable in the axial direction (in the front-rear direction) with respect to the outer surface of the spindle 20 outside the rear end portion of the housing 10, and the clutch unit selectively couples or separates the spindle 20 with respect to the drive pulley 40 and the housing 10 while being coupled to the drive pulley 40 or coupled to the bearing rear surface 11 fixed to the rear end portion of the housing 10 according to a forward-rearward movement direction.

Referring to FIG. 3, the clutch unit of the first embodiment includes a fixed clutch 61 that is fixed to a front surface of the drive pulley 40 and has a fixed serration 61a formed along a circumferential direction, a movable clutch 62 that is formed in a ring shape and is slidable on an outer surface of the spindle 20 in the axial direction but is connected to be non-rotatable relative to the outer surface, a front coupler 63 that is installed on a front surface of the movable clutch 62 and having a front serration 63a formed to engage with a housing serration 11a formed behind the housing 10, a rear coupler 64 that is installed on a rear surface of the movable clutch 62 and has a rear serration 64a formed to engage with the fixed serration 61a of the fixed clutch 61, and a clutch driving unit that linearly moves the movable clutch 62 in the axial direction of the spindle 20.

The fixed clutch 61 has a circular ring shape and is fixedly installed in the front end of the drive pulley 40. The fixing clutch 61 may be formed as a separate body with the drive pulley 40 and then fixed by a bolt to a front portion of the drive pulley 40, but differently, the fixing clutch 61 may be formed integrally with the drive pulley 40.

The movable clutch 62 is disposed in front of the fixed clutch 61 and is installed to slide in the front-rear direction with respect to the outer surface of the spindle 20. A plurality of clutch keys 69a and a plurality of clutch key grooves 69b, which allows the movable clutch 62 to be movable in the axial direction with respect to the spindle 20 but restricts the movable clutch 62 so that the movable clutch 62 does not rotate in the circumferential direction, are formed between the inner circumferential surface of the movable clutch 62 and the outer surface of the spindle 20.

The front coupler 63 is fixedly installed on the front surface of the movable clutch 62. The front coupler 63 may be manufactured as a separate body with the movable clutch 62 and then coupled to the movable clutch 62, but differently, may be manufactured integrally with the movable clutch 62. The front serration 63a engaging with the housing serration 11a formed on the rear surface of the housing rear cover 11 is formed on the front surface of the front coupler 63 along the circumferential direction.

The rear coupler 64 is fixedly installed in the rear portion of the movable clutch 62, and the rear serration 64a engaging with the fixed serration 61a of the fixed clutch 61 is formed on the rear surface along the circumferential direction. The rear coupler 64 may be manufactured as a separate body from the movable clutch 62 and then fixedly coupled to the movable clutch 62, but differently, the rear coupler 64 and the movable clutch 62 may be integrally molded and manufactured.

The clutch driving unit is configured to move the movable clutch 62 forward or rearward according to an operation mode. In this embodiment, the clutch driving unit includes a spring mount member 65a that is installed to be fixed to an outer surface of the spindle 20 between a front portion of the movable clutch 62 and a rear end portion of the housing 10, a first elastic member 65 that is installed in the spring mount member 65a to apply an elastic force to a rear portion of the movable clutch 62, a ring-shaped clutch piston 66 that is installed to be axially movable in the housing 10 and including a traction protrusion 66a connected to an outer peripheral surface of the movable clutch 62 and formed to protrude radially inward in a rear end portion, a second elastic member 67 that applies an elastic force to the rear end portion of the housing 10 rearward of the clutch piston 66, and a piston actuator 68 that applies an external force forward to the clutch piston 66 to move forward the clutch piston 66.

The first elastic member 65 is constituted by a plurality of compression coil springs installed inside a groove formed on a rear surface of the spring mount member 65a and applies an elastic force to the movable clutch 62 rearward.

The spring mount member 65a has a circular ring shape and is disposed between the movable clutch 62 and the housing rear cover 11, and has a thread formed on the inner circumferential surface thereof, and is fixed to be spirally coupled to the screw thread formed on the outer surface of the spindle 20.

The clutch piston 66 is in the form of a ring having an inner diameter larger than an outer diameter of the movable clutch 62 and is slidably installed on the housing rear cover 11 in the axial direction. The traction protrusion 66a protrudes radially inward in the rear end portion of the inner circumferential surface so that the clutch piston 66 pulls the movable clutch 62 forward. Therefore, the traction protrusion 66a moves the movable clutch 62 forward by pulling forward a locking protrusion 62c formed in the front end portion of the outer peripheral surface of the movable clutch 62.

The piston actuator 68 may be a pneumatic cylinder, a hydraulic cylinder, or a solenoid (electrical) type actuator, and acts to move the clutch piston 66 forward. In this embodiment, the piston actuator 68 is a pneumatic cylinder, and when a pneumatic pressure is applied to the inside of the piston actuator 68, a pressure is applied to the rear of the clutch piston 66, and thus, the clutch piston 66 overcomes an elastic force of the second elastic member 67 and moves forward. Differently, the piston actuator 68 may be configured so that the second elastic member 67 is not used and the pneumatic pressure acts in both forward and rearward directions.

Meanwhile, a first encoder pulley 91 constituting the position detection unit is fixedly installed in the front end of the drive pulley 40, and a second encoder pulley 92 is rotatably installed behind the housing 10. A timing belt 93 for transmitting a rotational force of the first encoder pulley 91 to the second encoder pulley 92 is wound around the first encoder pulley 91 and the second encoder pulley 92. In addition, a central portion of the second encoder pulley 92 is axially coupled with an encoder 94 to detect the amount of rotation. The encoder 94 is electrically connected to the controller 90 and transmits a signal for the detected location information to the controller 90.

Therefore, when the drive pulley 40 is coupled with the rear coupler 64 of the clutch unit and rotates together with the spindle 20, the first encoder pulley 91 rotates together with the drive pulley 40, and the rotational force of the rotational force of 91 is transmitted to the encoder 94 through the timing belt 93 so that the controller 90 can detect a rotational speed of the spindle 20 and a position of the front coupler 63.

When the rotation position of the movable clutch 62 is adjusted to an initial position so that the front serration 62a of the front coupler 63 fixed to the movable clutch 62 accurately engages with the housing serration 11a immediately before the movable clutch 62 moves forward and the operation mode is switched to the clamping operation mode, and when the position of the fixed clutch 61 is finely adjusted so that the fixed serration 61a of the fixed clutch 61 accurately engages with the rear serration 64a of the rear coupler 64 immediately before the movable clutch 62 moves rearward and the operation mode is switched from the clamping operation mode to the spindle operation mode, the encoder 94 and the first encoder pulley 91 are used. Moreover, differently, the position of the movable clutch 62 may be detected and adjusted using the drive pulley 40 and a spindle encoder of a spindle motor connected to a drive belt (not shown) without using the encoder 94 and the encoder pulleys 91 and 92.

In addition, in order check that the movable clutch 62 moves forward or rearward at a predetermined stroke and whether the front serration 63a and the rear serration 64a formed on the front and rear surfaces of the movable clutch 62 accurately engage the housing serration 11a and the fixed serration 61a, respectively, a clutch sensor dog 98 is installed on an outer peripheral surface of the movable clutch 62, and a clutch position sensor 97 for sensing a forward-rearward displacement of the clutch sensor dog 98 is installed below a rear portion of the housing 10.

A method of operating the ELECTRICAL DRIVING SYSTEM according to an embodiment of the present disclosure having the configuration will be described in more detail with reference to FIGS. 4 and 5 as follows.

In the clamping operation mode in which the jaw J of the machine tool clamps the workpiece, the movable clutch 62 of the clutch unit moves forward, and the front serration 63a of the front coupler 63 engages with the housing serration 11a of the housing rear cover 11 (see FIG. 4). Moreover, in the spindle operation mode in which the spindle 20 rotates at a high speed to machine the workpiece in a state where the jaw J of the machine tool clamps the workpiece, the movable clutch 62 moves rearward and the rear serration 64a of the rear coupler 64 engages with the fixed serration 61a of the fixed clutch 61 (see FIG. 5).

First, in order to start the clamping operation mode, the front serration 63a of the front coupler 63 should be able to accurately engage the housing serration 11a of the housing rear cover 11. Therefore, when the clamping operation mode starts, the controller 90 rotates the drive pulley 40 by a certain amount based on the position information of the movable clutch 62 received through the encoder 94 of the position detection unit and aligns the position of the movable clutch 62 to an initial origin position. At this time, the movable clutch 62 is engaged with the fixed clutch 61 via the rear coupler 64, and thus, rotates together with the drive pulley 40.

Subsequently, a pneumatic pressure is applied to the piston actuator 68 of the clutch driving unit, and the clutch piston 66 overcomes the elastic force of the second elastic member 67 and moves forward by a predetermined distance as illustrated in FIG. 4. When the clutch piston 66 moves forward, the traction protrusion 66a at the rear end of the clutch piston 66 pulls the locking protrusion 62c of the movable clutch 62 forward to advance the movable clutch 62. Accordingly, the rear coupler 64 in close contact with the rear end of the drive pulley 40 is separated from the fixed clutch 61 fixed to the drive pulley 40. In addition, the front serration 63a of the front coupler 63 installed on the front surface of the movable clutch 62 is engaged with the housing serration 11a formed on the rear surface of the housing rear cover 11. Accordingly, the rotation of the spindle 62 is limited, and the spindle 20 is fixed to the housing rear cover 11 to limit the rotation of the spindle 20.

When the spindle motor (not illustrated) is operated by applying power to the spindle motor while the spindle 20 is constrained by the housing rear cover 11 at the rear of the housing 10, the power of the spindle motor is transmitted to the drive pulley 40, and the drive pulley 40 rotates in the reverse direction (unclamping direction).

As the drive pulley 40 rotates in the reverse direction while the spindle 20 is fixed with respect to the housing 10, the carrier member 50 rotates along a periphery of the spindle 20. The drawbar keyway groove 31 and the drawbar key 32 that restrict the relative rotation of the drawbar 30 with respect to the spindle 20 and allow only the movement of the drawbar 30 in the front-rear direction are formed between the outer peripheral surface of the front portion of the drawbar 30 and the outer peripheral surface of the front portion of the spindle 20. Therefore, when the carrier member 50 rotates in the reverse direction with respect to the outer surface of the spindle 20, the leadscrew portion 35 and the drawbar 30 coupled thereto are linearly moved forward by the action between the screw thread formed on the inner peripheral surface of the carrier member 50 and the screw thread formed on the outer peripheral surface of the leadscrew portion 35. As the drawbar 30 linearly moves forward with respect to the spindle 20, the jaws J are opened to unclamp the workpiece.

Subsequently, when the spindle motor (not illustrated) operates in a direction opposite to the previous direction, the drive pulley 40 rotates in a forward direction and the carrier member 50 rotates in a direction opposite to the previous direction. Accordingly, the leadscrew portion 35 and the drawbar 30 move rearward in the axial direction, and accordingly, the jaws J are closed and the workpiece is tightly clamped.

Of course, in this embodiment, the case in which the workpiece is clamped by the rearward movement of the drawbar 30 and the clamping force is released by the forward movement is described. However, on the contrary, the workpiece may be clamped by the forward movement of the drawbar 30 and the clamping force may be released by the rearward movement of the drawbar 30. That is, in this embodiment, the case is described in which when the drive pulley 40 rotates in the forward direction, the jaws J clamps the workpiece, and when the drive pulley 40 rotates in the reverse direction, the jaws J unclamps the workpiece. However, depending on the machine tool, on the contrary, when the drive pulley 40 rotates in the reverse direction, the jaw J may clamp the workpiece, and when the drive pulley 40 rotates in the forward direction, the jaw J may clamp the workpiece.

As described above, when the clamping operation mode in which the drawbar 30 moves rearward and the jaws J firmly clamps the workpiece is completed, the controller 90 ascertains positional arrangement states of the fixed serration 61a of the fixed clutch 61 and the rear serration 64a of the rear coupler 64 of the movable clutch 62 according to the position information of the fixed clutch 61 detected by the encoder 94, and if there is a misalignment between serrations, a torque is further applied to the spindle motor (not illustrated) to finely rotate the drive pulley 40 in the forward direction, that is, in the direction (clamping direction) of clamping the workpiece to adjust the position so that the fixed serration 61a and the rear serration 64a are accurately engaged with each other.

When the position adjustment is completed, the clutch unit is operated to move the movable clutch 62 rearward so that the rear serration 64a of the movable clutch 62 engages with the fixed serration 61a of the fixed clutch 61 to drive, and thus, the operation mode is switched to the spindle operation mode in which the rotational force of the drive pulley 40 can be transmitted to the spindle 20 through the movable clutch 62. Subsequently, the spindle motor is operated at high speed to rotate the spindle 20 at high speed, and thus, a machining operation is performed on the workpiece.

When the pneumatic pressure of the piston actuator 68 is released as illustrated in FIG. 5 when the operation mode as described above is switched, the clutch piston 66 and the movable clutch 62 are pushed rearward and moved by the elastic forces of the second elastic member 67 and the first elastic member 65, respectively.

Accordingly, the front coupler 63 on the front surface of the movable clutch 62 is separated from the housing rear cover 11, and while the rear serration 64a of the rear coupler 64 on the rear surface of the movable clutch 62 is engaged with the fixed serration 61a of the fixed clutch 61, the movable clutch 62 is coupled to the drive pulley 40 to receive the rotational force. Accordingly, the spindle 20 in which the relative rotation with the movable clutch 62 is restricted receives the rotational force of the drive pulley 40.

Subsequently, when power is applied to the spindle motor (not illustrated) and operated at a predetermined rotational speed, the drive pulley 40 and the movable clutch 62 and spindle 20 coupled thereto are rotated at the predetermined rotational speed, and thus, the workpiece is machined. In this case, in the drawbar 30, the leadscrew portion 35 at the rear end is spirally coupled with the carrier member 50, and thus, the drive pulley 40, the carrier member 50, the leadscrew portion 35, and the drawbar 30 rotate together.

As described above, according to the present disclosure, the positions of the spindle 20 and the fixed clutch 61 and/or the movable clutch 62 of the clutch unit are detected by the position detection unit, and based on the detected position information, the position of the movable clutch 62 is aligned to the initial origin position when the spindle operation mode is switched to the clamping operation mode, and thus, the front serration 63a of the front coupler 63 and the rear end portion of the housing 10 are configured in the movable clutch 62 can be accurately engaged with each other. Moreover, when the clamping operation mode is switched to the spindle operation mode, the position of the fixed clutch 61 is finely adjusted, and thus, the fixed serration 61a of the fixed clutch 61 and the rear serration 64a of the movable clutch 62 are accurately engaged with each other. Therefore, an accurate rotation control of the spindle 20 can be obtained during machining in the spindle operation mode.

In addition, due to the self-locking function of the leadscrew portion 35 that is spirally coupled with the screw thread of the carrier member 50, there is an advantage in that the initial clamping force can be maintained when the clamping operation of the workpiece performed by the rearward movement of the drawbar 30 is switched to the spindle operation mode in which the workpiece is machined by the rotation of the spindle 20.

Second Embodiment

FIGS. 6 to 11 illustrate another embodiment of the ELECTRICAL DRIVING SYSTEM of the machine tool according to the present disclosure, and a configuration of an ELECTRICAL DRIVING SYSTEM of a second embodiment is the same as or similar to the configuration of the ELECTRICAL DRIVING SYSTEM of the above-described first embodiment except for a configuration of a clutch unit for selectively connecting the spindle 20 to the drive pulley 40 and the housing 10, and thus, detailed descriptions of the same or similar components will be omitted.

Referring to FIG. 8, the clutch unit of the ELECTRICAL DRIVING SYSTEM of this embodiment includes a fixing member 161 that is installed to be non-rotatable relative to an outer surface of the spindle 20 between a front portion of the drive pulley 40 and a rear portion of the housing 10 and has a first serration 161a formed on a rear surface along a circumferential direction, a pulley clutch 162 that is installed in the front portion of the drive pulley 40 to be movable in a front-rear direction and has a second serration 162a that engages with the first serration 161a when moving forward and is formed along the circumferential direction, a pulley clutch spring 163 that applies an elastic force to the drive pulley 40 forward of the pulley clutch 162, a locking member that fixes the fixing member 16 to the housing 10 or release the fixing member 16 from the housing 10, and a clutch operation member that moves the pulley clutch 162 rearward.

The fixing member 161 has a circular ring shape and is installed immediately behind the housing rear cover 11. The fixing member 161 can be moved forward and rearward with respect to the spindle 20 by a spline key 167, but a relative movement therebetween along the circumference of the spindle 20 is impossible. The first serration 161a is formed on the rear surface of the fixing member 161 along the circumferential direction. A plurality of locking grooves 161b for fixing and releasing the locking member are disposed on the outer peripheral surface of the fixing member 161 at predetermined intervals along the circumferential direction. In addition, a piston accommodating groove 161c for accommodating the piston ring 164 constituting the clutch operation member is formed on the rear surface of the fixing member 161.

The pulley clutch 162 is installed inside a clutch accommodating groove 43 formed on the front surface of the drive pulley 40 so that the pulley clutch 162 can move in the front-rear direction but cannot perform a relative rotational movement. To this end, as illustrated in FIG. 9, a plurality of guide blocks 162b having a polygonal cross section such as a quadrangle are formed to protrude rearward on the rear surface of the pulley clutch 162, and a rectangular guide groove 44 into which the guide block 162b is inserted is formed on the rear surface of the clutch accommodating groove 43.

A pulley clutch spring 163 is installed between the rear surface of the pulley clutch 162 and the front surface of the drive pulley 40 to apply an elastic force to the pulley clutch 162 forward with respect to the drive pulley 40.

The pulley clutch 162 is pressed rearward by the clutch operating member to overcome the elastic force of the pulley clutch spring 163 and moves rearward. In this embodiment, the clutch operation member includes the piston ring 164 that is installed inside the piston accommodation groove 161c formed in the fixing member 161 and pushes the pulley clutch 162 rearward while moving rearward by an air pressure applied to an inside of the piston accommodation groove 16c, and a piston bearing 165 that is disposed between the pulley clutch 162 and the piston ring 164 to rotatably support the pulley clutch 162 with respect to the piston ring 164. The piston bearing 165 serves to minimize the frictional force between the pulley clutch 162 and the piston ring 164 when the pulley clutch 162 rotates.

The locking member is configured to perform a function of fixing or releasing the fixing member 161 with respect to the rear portion of the housing 10. In this embodiment, the locking member includes a fixing pin 171 that is installed to linearly reciprocate toward the fixing member 161 side behind the housing 10 and has a distal end inserted into the locking groove 161b formed on an outer peripheral surface of the fixing member 161, and a pin actuator 172 that linearly reciprocates the fixing pin 171. The pin actuator 172 may be a pneumatic cylinder or a solenoid.

The fixing pin 171 is installed so as to be movable in an up-down direction inside the pin actuator 172, and fixes the fixing member 161 to the housing 10 while a distal end of the fixing pin 171 is inserted into the locking groove 161b formed on the outer circumferential surface of the fixing member 161.

The pin actuator 172 is fixedly installed behind the housing 10, and includes a first port 172a to which a pneumatic pressure is applied for moving the fixing pin 171 inward in the radial direction, and a second port 172b to which a pneumatic pressure is applied for moving the fixing pin 171 outward in the radial direction.

Meanwhile, a pneumatic channel 161d extending from the piston accommodation groove 161c to the locking groove 161b is formed inside the fixing member 161, an air supply channel 171a communicating with the pneumatic channel 161d when the fixing pin 171 is inserted into the locking groove 161b is formed in the pin actuator 172 and the fixing pin 171, and a distal end portion of the air supply channel (not illustrated) formed in the pin actuator 172 is connected to an external air supply unit (not illustrated) to supply air to the pneumatic channel 161d and operate the piston ring 164. The air supply flow path 171a of the fixing pin 171 communicates with an air supply channel (not illustrated) of the pin actuator 172 when the fixing pin 171 moves upward and is inserted into the locking groove 161b of the fixing member 161, and when the fixing pin 171 moves downward and deviates to the outside of the locking groove 161b of the fixing member 161, the fixing pin 171 is displaced from the air supply channel (not illustrated) of the pin actuator 172, supply of air is cut off.

An ELECTRICAL DRIVING SYSTEM having the clutch having the configuration operates as follows.

In the clamping operation mode in which the jaw J of the machine tool clamps the workpiece, the fixing member 161 is fixed to the housing 10 by the locking member, the rotation of the spindle 20 is restrained, and the pulley clutch 162 of the clutch unit moves rearward and is separated from the fixing member 161 (see FIG. 10). Moreover, in the spindle operation mode in which the spindle 20 rotates at a high speed to machine the workpiece in a state where the jaw J of the machine tool clamps the workpiece, the coupling between the fixing member 161 and the locking member is released, the fixing member 161 and the spindle 20 freely rotate, and the pulley clutch 162 moves forward and is coupled with the fixing member 161 (see FIG. 11).

When the spindle operation mode is switched to the clamping operation mode, the locking member should fix the fixing member 161 to restrain the rotary motion of the spindle 20. Therefore, when the clamping operation mode starts, the controller 90 rotates the drive pulley 40 by a certain amount based on the position information of the drive pulley 40 and the pulley clutch 162 transmitted through the encoder 94 of the position detection unit and arranges the position of the fixing member 161 to the initial origin position. In this case, since the second serration 162a of the pulley clutch 162 is engaged with the first serration 161a of the fixing member 161, the rotary motion of the drive pulley 40 is transmitted to the fixing member 161 through the pulley clutch 162 to rotate the fixing member 161.

The locking groove 161b of the fixing member 161 and the fixing pin 171 of the locking member are accurately aligned by this positional alignment operation.

When the alignment operation is completed, as illustrated in FIG. 10, a pneumatic pressure is applied through the first port 172a of the pin actuator 172 of the locking member to move the fixing pin 171 upward, and the fixing member 161 is fixed to the housing 10 while the distal end of the fixing pin 171 is inserted into the locking groove 161b of the fixing member 161.

Subsequently, when air is supplied into the piston accommodating groove 161c through the air supply channel 171a of the pin actuator 172 and the fixing pin 171, the piston ring 164 installed in the fixing member 161 moves rearward. Accordingly, the pulley clutch 162 moves rearward, the first serration 161a of the fixing member 161 and the second serration 162a of the pulley clutch 162 are separated from each other, and a restraint state between the drive pulley 40 and the fixing member 161 is released.

Then, power is applied to the spindle motor (not illustrated) so that the drive pulley 40 and the carrier member 50 rotate in the reverse direction. In this case, the drawbar keyway groove 31 and the drawbar key 32 that restrict the relative rotation of the drawbar 30 with respect to the spindle 20 and allow only the movement of the drawbar 30 in the front-rear direction are formed between the outer peripheral surface of the front portion of the drawbar 30 and the outer peripheral surface of the front portion of the spindle 20. Therefore, when the carrier member 50 rotates, the leadscrew portion 35 and the drawbar 30 coupled thereto are linearly moved forward by the action between the screw thread formed on the inner peripheral surface of the carrier member 50 and the screw thread formed on the outer peripheral surface of the leadscrew portion 35. As the drawbar 30 linearly moves forward with respect to the spindle 20, the jaw J is opened to unclamp the workpiece.

Subsequently, when the spindle motor (not illustrated) operates in a direction opposite to the previous direction, the drive pulley 40 and the carrier member 50 rotate in the forward direction. Accordingly, the leadscrew portion 35 and the drawbar 30 move rearward in the axial direction, and thus, the jaw J is closed and the workpiece is tightly clamped.

Of course, in this embodiment as well, the case is described, in which the workpiece is clamped by the rearward movement of the drawbar 30 and the clamping force is released by the forward movement. However, on the contrary, the workpiece may be clamped by the forward movement of the drawbar 30 and the clamping force may be released by the rearward movement of the drawbar 30.

As described above, when the clamping operation mode in which the drawbar 30 moves rearward and the jaws J firmly clamps the workpiece is completed, the controller 90 ascertains positional arrangement states of the second serration 162a of the pulley clutch 162 and the first serration 161a of the fixing member 161 according to the position information of the pulley clutch 162 detected by the encoder 94, and if there is a misalignment between serrations, a torque is further applied to the spindle motor (not illustrated) to finely rotate the drive pulley 40 in the forward direction (clamping direction to adjust the position so that the second serration 172a and the first serration 161a are accurately engaged with each other.

When the position adjustment is completed, the pneumatic pressure applied to the air supply channel 171a of the fixing pin 171 is removed so that the piston ring 164 is moved forward by the elastic force of the pulley clutch spring 163. Then, the pulley clutch 162 moves forward so that the second serration 162a is accurately engaged with the first serration 161a of the fixing member 161, and thus, the operation mode is switched to the spindle operation mode in which the rotational force of the drive pulley 40 can be transmitted to the spindle 20 through the pulley clutch 162 and the fixing member 161. Subsequently, the spindle motor is operated at a high speed to rotate the spindle 20 at high speed, and thus, the machining operation is performed on the workpiece.

When the operation mode is switched, as illustrated in FIG. 11, the application of pneumatic pressure through the air supply channel 171a of the pin actuator 172 and the fixing pin 171 is stopped, and the external force applied to the piston ring 164 of the clutch unit rearward is removed. Accordingly, the pulley clutch 162 and the piston ring 164 are moved forward by the elastic force of the pulley clutch spring 163, the second serration 162a of the pulley clutch 162 and the first serration of the fixing member 161 are engaged with each other, and thus, the drive pulley 40 and the fixing member 161 are restrained to each other.

Subsequently, a pneumatic pressure is applied through the second port 172b of the pin actuator 172 so that the fixing pin 171 moves downward to release the fixed state of the fixing member 161.

In this state, when power is applied to the spindle motor to rotate the drive pulley 40 at a fixed speed at high speed, the pulley clutch 162, the fixing member 161, and the spindle 20 rotate together with the drive pulley 40, and thus, the workpiece is machined.

In the clutch unit configured in the ELECTRICAL DRIVING SYSTEM of this second embodiment, a component that performs a clutching operation slides on the outer surface of the spindle 20. Accordingly, in a state where the components constituting the clutch unit are fixed without moving at all, the pulley clutch 162 configured inside the drive pulley 40 receives a pressing force in the front-rear direction, coupling and separation between serrations occur, and thus, greater precision can be obtained.

Heretofore, the present disclosure is described in detail with reference to the embodiments, but those of ordinary skill in the art to which the present disclosure pertains will be able to make various substitutions, additions, and modifications within the scope not departing from the technical idea described above, and it should be understood that the modified embodiments also belong to the scope of protection of the present disclosure determined by the appended claims.

The present disclosure can be applied to a machine tool that machines a workpiece.

The invention claimed is:

1. A machine tool ELECTRICAL DRIVING SYSTEM comprising:
a housing installed to be fixed to a main body of a machine tool;
a hollow tubular spindle rotatably installed with respect to the housing inside the housing;
a drive pulley rotatably installed with respect to the spindle outside the spindle;
a spindle motor configured to rotate the drive pulley;
a drawbar installed to be linearly movable in an axial direction inside the spindle and configured to be rotatable together with the spindle;
a motion conversion unit configured to convert a rotary motion of the drive pulley into a forward-rearward linear motion of the drawbar;
a clutch unit installed outside the spindle to selectively connect the spindle to the drive pulley and the housing;
a position detection unit including a first encoder pulley fixed to the drive pulley, a second encoder pulley installed in the housing, a timing belt wound around the first encoder pulley and the second encoder pulley to transmit a rotational force of the first encoder pulley to the second encoder pulley, and an encoder axially coupled with the second encoder pulley to detect an amount of rotation and a rotation position of the drive pulley; and
a controller configured to perform a position adjustment process of rotating the drive pulley based on position information of the clutch unit detected by the position detection unit immediately before a spindle operation mode in which the spindle is connected to the drive pulley by the clutch unit is switched to a clamping operation mode in which the spindle is connected to the housing and immediately before the clamping operation mode is switched to the spindle operation mode, and aligning the drive pulley to the position of the clutch unit,
wherein the clutch unit includes:
a fixed clutch fixed to a front surface of the drive pulley and having a fixed serration formed along a circumferential direction,
a movable clutch formed in a ring shape and slidable on an outer surface of the spindle in the axial direction, wherein the movable clutch is non-rotatable relative to the outer surface of the spindle,
a front coupler installed on a front surface of the movable clutch and having a front serration configured to engage with a housing serration formed behind the housing in the clamping operation mode,
a rear coupler installed on a rear surface of the movable clutch and having a rear serration configured to engage with the fixed serration of the fixed clutch in the spindle operation mode, and
a clutch driving unit configured to linearly move the movable clutch in the axial direction of the spindle in the clamping operation mode,
wherein the controller is configured to rotate the drive pulley based on the position information detected by the position detection unit immediately before the spindle operation mode is switched to the clamping operation mode to align a position of the movable clutch to an initial original position, and the controller is configured to rotate the drive pulley to finely adjust a position of the fixed clutch in a clamping direction and align the fixed serration of the fixed clutch with the rear serration of the movable clutch based on the position information detected by the position detection unit immediately before the clamping operation mode is switched to the spindle operation mode.

2. The machine tool ELECTRICAL DRIVING SYSTEM of claim 1, wherein the controller rotates the drive pulley based on the position information of the clutch unit detected by the position detection unit immediately before the spindle operation mode is switched to the clamping operation mode to align the clutch unit to the initial original position, and the controller finely rotates the drive pulley in the clamping direction to adjust the drive pulley so that serrations of the clutch unit engage with each other based on the position information of the clutch unit detected by the position detection unit immediately before the clamping operation mode is switched to the spindle operation mode.

3. The machine tool ELECTRICAL DRIVING SYSTEM of claim 1, wherein the clutch driving unit includes a spring mount member installed to be fixed to an outer surface of the spindle between a front portion of the movable clutch and a rear end portion of the housing, a first elastic member installed in the spring mount member to apply an elastic force to a rear portion of the movable clutch, a ring-shaped clutch piston installed to be axially movable in the housing and including a traction protrusion connected to an outer peripheral surface of the movable clutch and formed to protrude radially inward in a rear end portion, a second elastic member configured to apply an elastic force to the rear end portion of the housing rearward of the clutch piston, and a piston actuator configured to apply an external force forward to the clutch piston to move forward the clutch piston.

4. The machine tool ELECTRICAL DRIVING SYSTEM of claim 1, wherein a clutch key and a clutch key groove that allows the movable clutch to axially move with respect to the spindle but restricts the movable clutch from rotating in a circumferential direction are provided between an inner peripheral surface of the movable clutch and the outer surface of the spindle.

5. The machine tool ELECTRICAL DRIVING SYSTEM of claim 1, wherein the motion conversion unit includes a leadscrew portion fixed to a rear portion of the drawbar and having a screw thread spirally formed on an outer surface, and a cylindrical carrier member coupled to the drive pulley to rotate together with the drive pulley and having a screw thread formed to be spirally coupled to the screw thread of the leadscrew portion on an inner peripheral surface.

\* \* \* \* \*